United States Patent Office

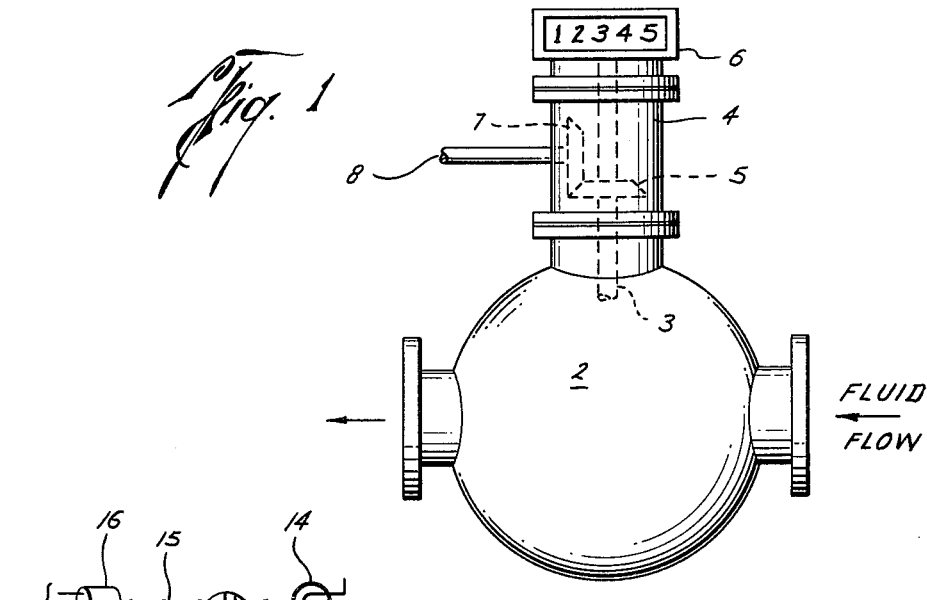
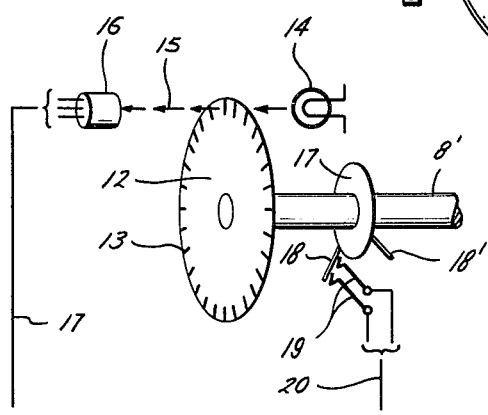
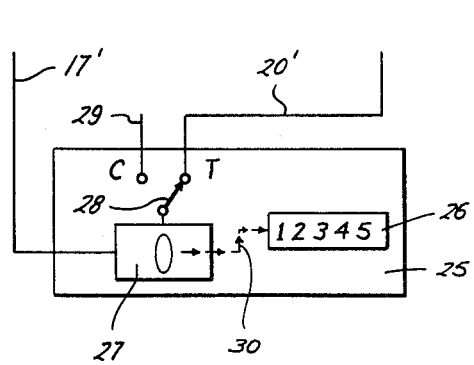

3,171,952
Patented Mar. 2, 1965

3,171,952
APPARATUS AND METHOD TO CHECK PERFORMANCE OF CERTAIN ELECTRONIC COUNTING SYSTEMS
Hart Brown, 5300 Brownway Road, Houston, Tex.
Filed Mar. 13, 1962, Ser. No. 179,392
8 Claims. (Cl. 235—92)

This invention relates to a method for checking the accuracy of performance of certain electronic counting systems. It is particularly useful to verify the accuracy of performance of electronic systems employed to calibrate liquid flow-meters used to measure petroleum transported in pipe lines.

In this disclosure the term "transducer" relates to any electro-mechanical device customarily used to deliver a succession of substantially similar electrical impulses in response to a suitably impressed mechanical displacement. The term "electronic system" relates to an assembly including a transducer, cables from transducer to electronic gate, electronic gate, electronic counter with or without additional mechanical register, and power supply for the assembly. The term "gate" relates to a special electronic switch which is operated by a "gate-actuating signal," and which switch in its open state passes the transducer's impulses to the electronic counter, and in its closed state prevents the transducer's impulses from reaching the counter.

In the process of calibrating some types of fluid flowmeters, the total rotation of the flow-meter read-out shaft may be measured very precisely by counting suitably generated electrical impulses. A rotary transducer (or impulse generator) driven by the flow-meter read-out shaft, and which produces 1000 electrical impulses per flowmeter shaft rotation, is frequently employed. In this application the impulses pass from the rotary transducer through an electronic "gate" to a high speed electronic counter where the impulses are counted and registered. The number so registered is frequently called the "count." The calibration of the flow-meter is achieved by passing a precisely known volume of fluid through the flow-meter while simultaneously recording the exact number (the "count") of electrical impulses generated during said passages. Such a method is popular for the calibration (frequently called "proving") of flow-meters used to buy and sell petroleum and its products as they flow through a pipe line.

When calibrating a flow-meter whose shaft rotates substantially one time per barrel of fluid metered, the use of such electronic equipment permits reading the flow-meter to the nearest thousandths of a barrel. The mechanical register on such flow-meters generally read to 1/10 barrel and at best may be interpolated to 1/100 barrel. It is desirable that the electronic equipment provide readings (the "count") which are correct within plus or minus one electrical impulse for each calibration "run." A calibration run involves the passage through the flow-meter of a standard volume (frequently between 10 and 20 barrels) of fluid. A calibration "test" may comprise any number of runs. Each such run should yield a count close to the "average" of all runs comprising the test. When values of the count for individual runs are widely scattered about the average, a mal-function of part of the complex mechanical equipment or of part of the electronic system is indicated. It becomes important to determine without delay whether the mal-function is mechanical or electrical.

A typical electronic "system" frequently used contains a rotary transducer, at least 50 feet of cable to the gate, the gate circuit, and the counter with its power supply. Photo-electric rotary transducers are frequently selected because they require low driving torque and deliver a substantially constant-amplitude signal at a low impedance. The count registered for any run may be in error by one or more impulses, due to any of the following: weak or erratic signal generated by transducer; over counting due to uneven transducer speed; pick-up of extraneous signal by the cable; improper operation of the gate switch; improper operation of the electronic counter or its mechanical register; transients in the 120 volt A.C. supply source.

One object of this invention is to provide a convenient means to verify quickly and easily whether or not an electronic system such as is previously described, is functioning correctly. This invention relates to the method of checking the above described electronic system whether such system is used for flow-meter calibration or for other measurements.

Another object of this invention is to provide a method to check the performance of an electronic counter and gate circuit system by metering into said system a precisely known number of electrical impulses.

A further object of this invention is to use a rotary transducer (which may be a sliding brush type, optical type, magnetic type or any other type) to generate and deliver a precisely known number of electrical impulses to an electronic system as above described, for the purpose of checking the proper performance of the electronic system.

A particular object of this invention is to provide a convenient method to check such an electronic system when said system is used in connection with the calibration of fluid flow-meters.

It is readily apparent that the above described electronic system may be employed for certain read-out purposes during the routine use of a fluid flow-meter, as well as for the calibration of the meter. It is an additional object of this invention to provide a method and means to check the proper functioning of the electronic system when so employed.

The invention will be more readily understood from a reading of the following specifications and by reference to the accompanying drawings forming a part thereof, wherein an example of the invention is shown and wherein:

FIGURE 1 is a vertical sectional view diagrammatically illustrating a fluid flow-meter having a conventional "right-angle take-off" and a mechanical register installed in the flow-meter stack.

FIGURE 2 is a diagrammatical representation of a photo-electric rotary transducer modified to practice this invention.

FIGURE 3 is a block diagram representing a gate circuit and an electronic counter having a supplementary mechanical register, such as may be used to practice this invention.

In FIGURE 1, the body of a fluid flow-meter is represented by 2. 3 represents a vertical shaft driven by the mechanism in the flow-meter and which shaft in finality drives the mechanical register 6 mounted on the extreme top end of the flow-meter stack. Numeral 4 represents the housing of a conventional "right-angle take-off" inserted in the meter stack. 5 is a beveled gear pinned to shaft 3. This gear meshes with a mating beveled gear 7 which in turn drives the shaft 8. The total amount which the shaft 8 rotates during a given time interval is essentially proportional to the total amount of fluid which passes through the flow-meter 2 during the same interval.

In FIGURE 2 the basic essentials of the rotary photo-electric transducer are represented. 8' is a shaft (driven from shaft 8 of the flow-meter). Shaft 8' is supported on suitable bearings not shown here. Likewise the whole instrument is cased in a suitable enclosure also not shown here. Mounted on the shaft 8' is a disc 12 around the periphery of which are a large number of windows 13, usually equally spaced. 14 represents a light source, usually an incandescent bulb, from which a beam of light 15 is directed onto the edge of the rotating disc shutter 12 so that as the shutter rotates the light is alternately passed and alternately interrupted by the windows in the edge of the rotating disc shutter. This pulsating light beam impinges on a photo transistor 16 causing the photo transistor to deliver electrical impulses to the electrical cable 17. Omitted from this illustrative diagram are the customary electronic components comprising a suitable amplifier which is generally used with the photo transistor 16. A device built on this principle and having "N" windows around the periphery of the disc will produce N sharp electrical impulses for each revolution of the shaft 8'.

In FIGURE 2 the elements 17, 18, and 19 illustrate an apparatus providing one means of practicing this invention. 37 is a disc secured to the shaft 8'. The disc preferably is of electrical insulating material. 18 is a metal pin extending radially from the periphery of the disc 37. Two spring wire brushes, or electrical contactors are represented by 19. These brushes are adjusted so that for each rotation of the shaft 8' the pin 18 will close an electrical contact between the brushes 19 for a short interval of time.

In some cases such as when the shaft 8' rotates very slowly, it may be desirable to use two or more contact-closing pins 18. In FIGURE 2 one such additional pin which might be used, is indicated by 18'.

FIGURE 3 is a block diagram representing an assembly 25 containing an electronic counter and register 26, an electronic gate 27, and a test switch 28 for selecting the source of the signal used to actuate the gate. The switch 28 has two positions, "C" and "T." "C" is used during the normal use of the electronic system for calibrating the flow-meter. "T" is used for testing the accuracy of performance of the electronic system, which function is the subject of this invention. 29 represents the cable through which the gate-actuating signal normally enters the assembly 25 when system is used for calibrating flow-meter. 20' represents the cable by which the gate-actuating signal normally enters the assembly 25 when testing. 17' represents the cable by which the stream of electrical impulses initiated by the photo transistor 16 and transmitted by cable 17, both in FIGURE 2, enter the assembly 25.

Details such as batteries or other sources of electrical energy, amplifiers, filters, etc., all of which are familiar to persons skilled in electronics, have been omitted herein so as to simplify presentation of the essential elements of this invention.

The gating circuit may be comprised of various arrangements of electronic components well known to those skilled in the art of electronics. In any event its operation is such that a suitable electronic signal introduced through the test switch 28 causes the gate to change state, that is, alternately to close and to open. Thus when the first actuating signal reaches a closed gate, the gate will open. The second actuating signal will close the gate; the third actuating signal will open the gate; the fourth actuating signal will close the gate, etc. The function of the gate is alternately to pass or stop a stream of signals 30 entering through cable 17 and leaving the gate and passing into the electronic counter and register 26.

One important application of this invention is in practicing the art of "meter-proving." In this application, with the switch 28 on "T," with the contactors 19 open, and with the gate 27 closed, the electronic counter and register 26 should then be reset to read Zero. The fluid passing through the flow-meter 2 drives the rotary transducer which delivers a stream of electrical impulses through cable 17' to the closed gate 27. Since the gate 27 is closed, these impulses pass no further. The continued rotation of the shaft 8' causes the pin 18 to contact simultaneously the two brushes 19 which pass a gate-actuating signal through the cable 20' and through the test switch 28 to the gate 27. Reception of this single signal by the gate 27 changes its state from closed to open and immediately permits the stream of impulses arriving through cable 17' to pass through the gate 27 and into the electronic register 26 where they are registered and their sum is displayed. After the shaft 8' rotates one complete revolution with the gate 27 open, the pin 18 again contacts the two brushes 19 and transmits a gate-actuating signal through the cable 20' and the switch 28, into the gating circuit 27 causing it to change state, that is, close, and immediately stop the passage of the stream of impulses 30 from reaching the register 26. Obviously the register should at this point display a number exactly equal to the number of windows on the disc 12. Assume there are 1000 windows 13 around the periphery of disc 12. Register 26 should then display the number 1000. If this apparatus is left operating, the transducer will essentially meter 1000 impulses through the gate to the register 26 during each second revolution of the shaft 8'. During each revolution of the shaft 8' the rotary switch, comprised of elements 18 and 19, will complete one action; and therefore for each rotation of the shaft 8' the gating circuit 27 will be exercised one time. If this apparatus is permitted to run for a large number of revolutions (using a disc 12 which has 1000 windows), and if the apparatus is then stopped during the period of time when the gate is closed, the electronic register 26 should then read an exact multiple of 1000, that multiple being one half the total number of revolutions of the shaft 8', which has transpired during the test period. If the number displayed by the register 26 is other than an exact multiple of 1000, that deviation is a measure of the less-than-ideal performance of the whole electronic system comprising the electronic transducer, the gating circuit, and the electronic counter as well as the rotary switch elements 18 and 19. This illustrates the test procedure which is the object of this invention.

In practical use when such deviation occurs, or when such a deviation exceeds a pre-determined allowable limit, the electronic equipment must be serviced and adjusted until the deviation is again reduced within its allowable limits. Likewise when this test is performed and the deviations are within the allowable limit, the user of the electronic system is assured of its proper performance in carrying out the art of meter-proving. The value to the user of the equipment of having this assurance cannot be over estimated. There are ever present many mechanical and hydraulic factors which cause small deviations in fluid flow-meter output readings during calibration runs. It is essential that the operator known his electronic equipment is not contributing any such deviations. It is difficult enough to locate and correct mechanical factors producing such deviatons, and it is essential that the electronic equipment shall not confuse the problem by adding or losing counts on the register 26 due to any minor malfunctions of the electronic system.

In practicing this invention, it is sometimes convenient to rotate the shaft 8' at very low speeds, such as one rotation per 4 minutes. Under these conditions it may be convenient to add the pin 18' to the disc 37, such that the elapsed time required for the shaft to rotate from 18 and 18' is perhaps one minute, instead of four minutes for a complete rotation. In this case the number of impulses metered to the counter would be perhaps 250 instead of 1000, and a test could be had in one minute instead of four.

In practicing this invention various types of electrical switches have been employed in place of the disc 37 and pin 18 illustrated in FIGURE 2. For example, a cam actuating a microswitch was tried. The invention could be practiced equally well using a light beam actuating a photo sensitive device or by magnetic means. The exact switching means selected depends upon various factors present for each application, such as space available, torque limitation, shaft speed, etc. Thus this invention does not relate to the form of switch used, but permits the use of any kind of switch or device which will meter out an exact and pre-determined number of electrical impulses which impulses are substantially similar to the impulses which the electronic counter receives in its normal usage.

This invention relates to the testing of or checking the precision of performance of any electronic system comprising a transducer, a gate, and an electronic counter. Although an electronic system employed for flow-meter calibration has been used as an example in this disclosure; the invention is not limited to such a specific application.

Although this disclosure describes in detail only one specific application as an example, this invention contemplates various means whereby a specific and pre-determined number of electrical impulses may be delivered to the electronic system on a repetitive basis, whereby the accuracy of performance of the system may thereby be measured or vertified. For example, the contacting switch (18 and 19 in the above description) need not be attached to the rotating shaft; instead it may be a part of the disc shutter; or it may be mechanically entirely separate from the rotary transducer so long as it is synchronized mechanically or electrically with the rotary transducer; or it may be inoperative during normal use of the electronic system, and be put in motion only during testing procedures by engaging a suitable clutch. Likewise the transducer need not necessarily be rotary so long as it is capable of being repetitive; for example, it may employ a linear motion such as that of a piston in a cylinder. The essential aspect is that one or more switching devices may be actuated by the transducer in such a way that a standard and definitely known number of electrical impulses delivered from the transducer are singled out and supplied to the counter to be counted and registered; and that in the process the gate is used to start and to stop the standard number of electrical impulses so that the precision of performance of the gate and counter are simultaneously determined.

What I claim is:

1. Apparatus consisting of an assembly of electro-mechanical devices which apparatus certifies that all of its own sections, components, and devices are operating correctly, said apparatus including:

Counting means to count substantially high speed electrical impulses delivered to said counter, Gating means to pass said impulses to said counter when said gate is open, and to stop said impulses from reaching said counter when said gate is closed, Signal means consisting of a single discrete electrical signal to control the state of the said gate such that each successive said signal introduced to the control terminals of said gate causes said gate to change its state successively from open to closed, then from closed to open, and to continuously repeat such operation, Repetitive transducer means to generate a series of substantially similar electrical impulses such that exactly the same number of said impulses are generated each time said transducer repeats its normal repetitive mechanical cycle, Contacting means attached to said transducer to produce a single said signal during each said mechanical cycle of said transducer, Cable means to conduct said impulses and said signals from said transducer to said gate and said counter.

Switching means to channel said signals into control terminals of said gate during certification tests, and to exclude said signals from control terminals of said gate when said apparatus is performing other functions.

2. Apparatus defined in claim 1 wherein said transducer means comprises a rotating shaft driving an opaque disc having a plurality of transparent windows dispersed about its periphery so that said windows interrupt light falling on a photo cell which in turn initiates a plurality of electrical impulses during each complete rotation of said shaft.

3. Apparatus defined in claim 2, wherein said contacting means comprises a single electrical contactor arranged to be actuated once during each revolution of the shaft of said transducer.

4. Apparatus defined in claim 1, wherein, said transducer means comprises a rotating shaft driving a rotary switch initiating a plurality of electrical impulses during each complete rotation of said shaft.

5. Apparatus defined in claim 1, wherein said transducer means comprises a reciprocating member initiating a plurality of electrical impulses during each stroke by virtue of effecting a plurality of electrical contacts or by a plurality of interruptions of a light beam falling on a photo cell.

6. Apparatus defined in claim 1, wherein, said contacting means is secured in a fixed rather than adjustable manner to the frame of said transducer.

7. Apparatus defined in claim 1, wherein said transducer means is arranged to generate exact multiples of ten said electrical impulses during each said mechanical cycle.

8. An assembly of electro-mechanical apparatus including:

Photo-electric rotary transducer means to deliver a specific plurality of electrical impulses during each revolution of said transducer's shaft, and also to deliver one sharp electrical signal in a separate circuit during each revolution of said transducer's shaft;

Counting means to count and register said impulses;

Gating means to pass said impulses to said counter when said gate is open and to prevent said impulses reaching said counter when said gate is closed, said gate being of such construction that it alternately opens, then closes, then opens, and continuously repeats such operation, upon receipt of each successive and discrete control electrical signal;

Cable means transmitting said photo-electric impulses through said gate to said counter; and Connecting means transmitting said sharp electrical signal from said transducer to the control terminals of said gate.

References Cited by the Examiner

UNITED STATES PATENTS

| | | | |
|---|---|---|---|
| 2,088,297 | 6/37 | Koenig | 235—92 |
| 2,131,911 | 10/38 | Ayres | 250—236 |
| 2,266,862 | 12/41 | Hardey | 235—92 |
| 2,431,591 | 11/47 | Snyder et al. | 235—154 |
| 2,680,241 | 6/54 | Gridley | 340—206 |
| 2,734,188 | 2/56 | Jacobs | 340—206 |
| 2,770,798 | 11/56 | Roth | 340—206 |
| 3,024,986 | 3/62 | Strianese et al. | 250—236 |
| 3,074,631 | 1/63 | Buysch | 235—92 |

MALCOLM A. MORRISON, *Primary Examiner.*